(12) United States Patent
Bender

(10) Patent No.: US 6,975,918 B2
(45) Date of Patent: Dec. 13, 2005

(54) PROCESSING DEVICE, MEASURING DEVICE, AND CORRECTING DEVICE FOR THE MANUFACTURE OF PRODUCTS

(75) Inventor: Christoph Bender, Bexbach (DE)

(73) Assignee: ALSTOM Technology LTD, Baden (SE)

( * ) Notice: Subject to any disclaimer, the term of this patent is extended or adjusted under 35 U.S.C. 154(b) by 0 days.

(21) Appl. No.: 10/658,404

(22) Filed: Sep. 10, 2003

(65) Prior Publication Data

US 2004/0049312 A1 Mar. 11, 2004

(30) Foreign Application Priority Data

Sep. 10, 2002 (DE) .......................................... 102 41 742

(51) Int. Cl.[7] .......................... G06F 19/00; G01N 37/00
(52) U.S. Cl. ...................... 700/175; 700/193; 700/109; 702/84
(58) Field of Search ................................ 700/108, 109, 700/175, 186, 192, 193; 702/81, 84, 182

(56) References Cited

U.S. PATENT DOCUMENTS

| | | | | |
|---|---|---|---|---|
| 3,946,212 A | * | 3/1976 | Nakao et al. .................. | 702/84 |
| 4,031,368 A | * | 6/1977 | Colding et al. ............. | 700/173 |
| 4,456,960 A | * | 6/1984 | Wakai ......................... | 700/175 |
| 4,719,586 A | | 1/1988 | Moyer et al. ................. | 702/84 |
| 5,311,784 A | * | 5/1994 | Girard et al. .............. | 73/865.8 |
| 5,440,478 A | * | 8/1995 | Fisher et al. ................ | 700/109 |
| 5,444,640 A | | 8/1995 | Hirai .......................... | 700/193 |
| 5,943,237 A | * | 8/1999 | Van Boxem ................ | 700/108 |

FOREIGN PATENT DOCUMENTS

| | | |
|---|---|---|
| DE | 198 40 801 A1 | 3/2000 |
| DE | 100 17 378 A1 | 10/2001 |
| DE | 100 62 471 A1 | 7/2002 |
| EP | 0 431 572 A3 | 6/1991 |
| JP | 61-71946 A | 4/1986 |
| JP | 1-92050 A | 4/1989 |

OTHER PUBLICATIONS

Search Report from GB 0323821.9 (Jan. 29, 2004).
Search Report from DE 102 41 742.3 (Apr. 15, 2003).

* cited by examiner

*Primary Examiner*—Leo Picard
*Assistant Examiner*—Ryan A. Jarrett
(74) *Attorney, Agent, or Firm*—Cermak & Kenealy LLP; Adam J. Cermak

(57) ABSTRACT

The present invention relates to a production system (1) for the series manufacture of products, comprising
  a processing device (2) which, as a function of control commands, actuates a tool for processing one of the products,
  a measuring device (3) for the automatic measuring of a geometric actual dimension at one of the processed products,
  a correcting device (4) which is coupled to the processing device (2) and to the measuring device (3) and which compares the actual dimension with a preset target dimension which lies within a tolerance interval.

The correcting device intervenes in a corrective manner in the control commands of the tool if the actual dimension lies outside an intervention interval which lies within the tolerance interval.

19 Claims, 3 Drawing Sheets

PROCESSING DEVICE, MEASURING DEVICE, AND CORRECTING DEVICE FOR THE MANUFACTURE OF PRODUCTS

BACKGROUND OF THE INVENTION

1. Field of the Invention

The invention relates to a production system for the series manufacture of products, in which the products are manufactured to size from blanks by a processing operation, in particular by a machining-operation, such as, for example, drilling, milling, grinding, roughing and finishing.

2. Discussion of Background

Such a production system normally comprises one or more processing devices which permit automatic processing, preferably automatic machining, of the products. In this case, such a processing device, as a function of control commands, actuates one or more tools, in particular cutting tools, for processing the respective product. For example, such a processing device is a CNC milling machine.

In the case of products which are manufactured successively with such a processing device, the geometric dimensions of the products may as a rule not be exactly adhered to. This may be attributed, on the one hand, to inherent tolerances of the processing device, which occur, for example, when the respective tool does not start the processing of the next product exactly at the same starting position as in the case of the preceding product. The higher the quality of the processing device, the smaller are these inherent repetitive tolerances. On the other hand, tool wear and temperature effects may influence the dimensional accuracy of the production operation.

For the quality assurance of the production process, the processed products are each measured or are measured at random by a suitable measuring device. The measuring records thus produced manually or automatically are evaluated by the respective machine operator in order to be able to correct, if need be, the control commands of the processing device in a suitable manner. There is the problem here that smaller corrections, on account of the cost associated with them, cannot be carried out without delaying the production to an excessive degree. Furthermore, input errors may occur. In addition, correlations which cannot always be fully grasped by the machine operator occur between individual dimensions, so that the correction of a first dimension may entail impairment of a second dimension or of further dimensions.

SUMMARY OF THE INVENTION

Accordingly, one object of the invention is to deal with the problem of specifying an improved embodiment for a production system of the type mentioned at the beginning, which embodiment has in particular increased production quality and productivity.

According to the invention, this problem is solved by the subject matter of the independent claim. Advantageous embodiments are the subject matter of the dependent claims.

The present invention is based on the general idea of providing an automatic correcting device which, as a function of the actual dimensions automatically determined by the measuring device, automatically intervenes in the work of the processing device and corrects there the control commands of the respectively affected tool in a suitable manner. In this case, it is particularly important that the correcting device intervenes in the control commands of the respective tool in a corrective manner only when the actual dimension checked lies outside the intervention interval, which in turn lies within a tolerance interval containing the required target dimension. By means of such an intervention interval, the corrective behavior of the correcting device can be influenced in particular to the effect that, for example, an adverse vibration behavior in the actual dimensions of successive products can be avoided. Such vibrations may occur, for example, when correction quantities have approximately the same order of magnitude as inherent repetitive tolerances of the processing device. Nonetheless, the fully automatic correction of the control commands enables relatively small dimensional deviations to be taken into account for carrying out a correction. Input errors due to operating personnel can be avoided by the data transfer between the individual components of the production system.

In an especially advantageous development, the correcting device can be configured in such a way that it takes into account the history, that is to say the previous course of the production, and adapts the corrective intervention in a suitable manner in the control commands with the aid of statistical components, such as outlier behavior and trends.

In addition, provision may be made in a development for the intervention limits of the intervention interval to be varied automatically as a function of the history, that is to say as a function of preceding actual dimensions and/or corrective interventions.

According to a special development, the correcting device may also be configured in such a way that it simultaneously corrects a plurality of dimensions of the product which can influence one another. Since the correction quantities are determined automatically, relatively complex interrelationships may also be taken into account, so that it is possible in particular to correct, by appropriate corrective interventions, dimensions which correlate with one another and influence one another, without impairing other dimensions as a result.

Further important features and advantages of the production system according to the invention follow from the subclaims, from the drawings and from the associated description of the figures with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
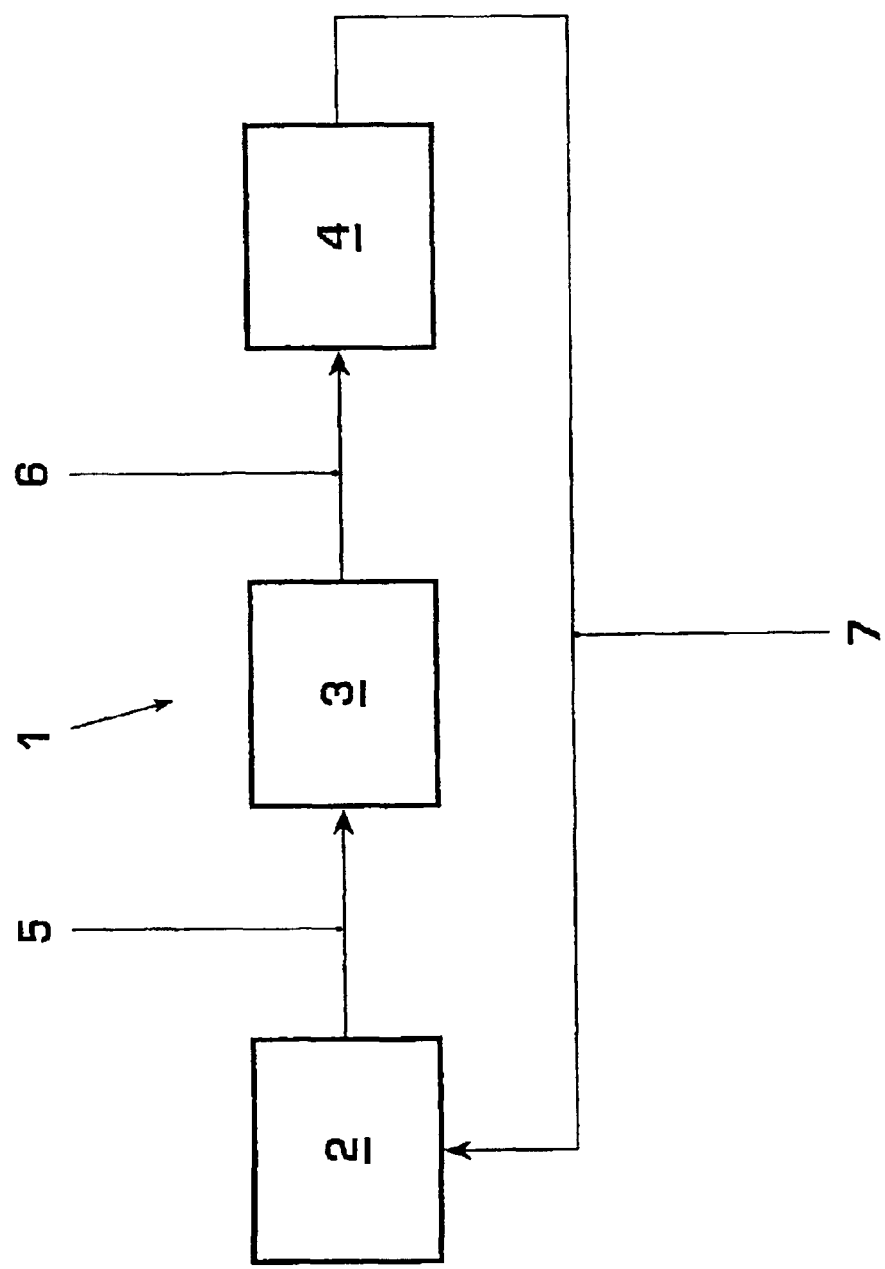
FIG. 1 shows a schematic circuit-diagram-like representation of a production system according to the invention.

Referring now to the drawings, wherein like reference numerals designate identical or corresponding parts throughout the several views, in FIG. 1 a production system 1 according to the invention comprises at least one processing device 2, at least one measuring device 3 and a correcting device 4. The production system 1 serves to manufacture products (not shown) which are manufactured, e.g.

machined, to size from blanks. These products are, for example, turbine blades.

Here, the processing device 2 is designed for the automatic machining of the products and for this purpose comprises at least one cutting tool (not shown). For the automatic processing of the product, the processing device 2 actuates the respective tool by means of control commands. The processing device 2 may be, for example, a computer-controlled machine, in particular a CNC machine, such as a CNC milling machine for example. Taking place in the processing device 2 in a known manner is a processing procedure in which suitable control commands are successively transmitted to the tool or tools in order to make the desired product from the respective blank.

The invention can preferably be used during a machining operation. In principle, however, other processing methods are possible which make the end product to size from a blank by influencing the dimensions, e.g. a forming operation.

After it has been processed, the product is fed manually or automatically according to arrow 5 to the measuring device 3, in which the product is automatically measured. In the process, the measuring device 3 determines at least one geometric actual dimension of the product. Normally, however, the measuring device 3 determines a plurality of actual dimensions of the product.

The measuring device 3, in accordance with arrow 6, provides the correcting device 4 with the actual dimensions determined. The correcting device 4 knows the target dimensions desired for the product and can carry out a target/actual comparison of the dimensions. With the aid of this comparison, the correcting device 4 can then generate a corrective intervention and transmit the latter in accordance with arrow 7 to the processing device 2. There, the corrective intervention produced by the correcting device 4 correspondingly corrects the control commands of the tool responsible for the respective actual dimension.

In this case, the correcting device 4 does not correct every (measurable) deviation of the actual dimensions from the respectively associated target dimension. On the contrary, a correction is only to be effected if the respectively measured actual dimension lies outside an intervention interval, which in turn lies within a tolerance interval which surrounds the respective target dimension.

Figure 2:
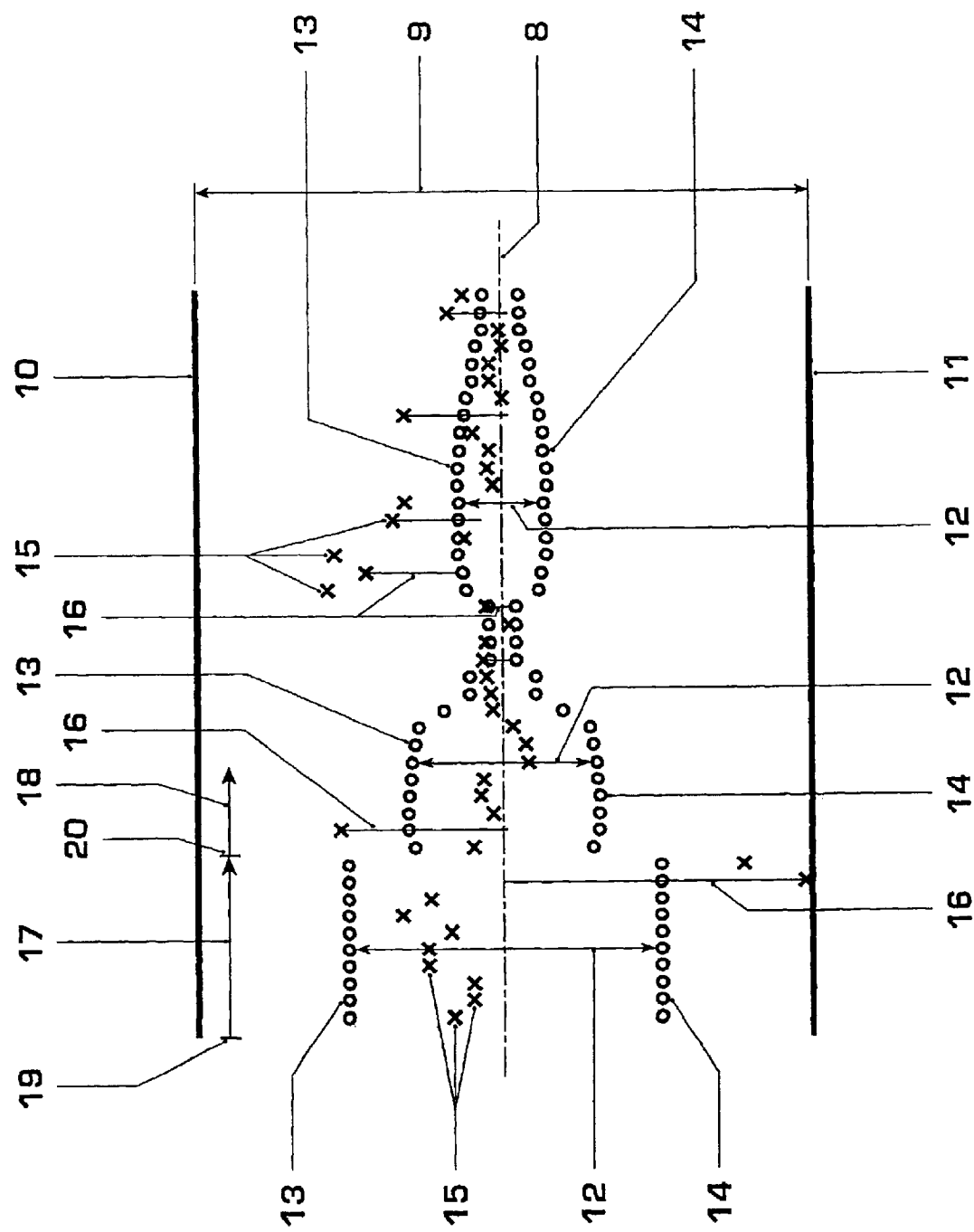
FIG. 2 shows a diagram for illustrating the time characteristic of a production operation.
Figure 3:
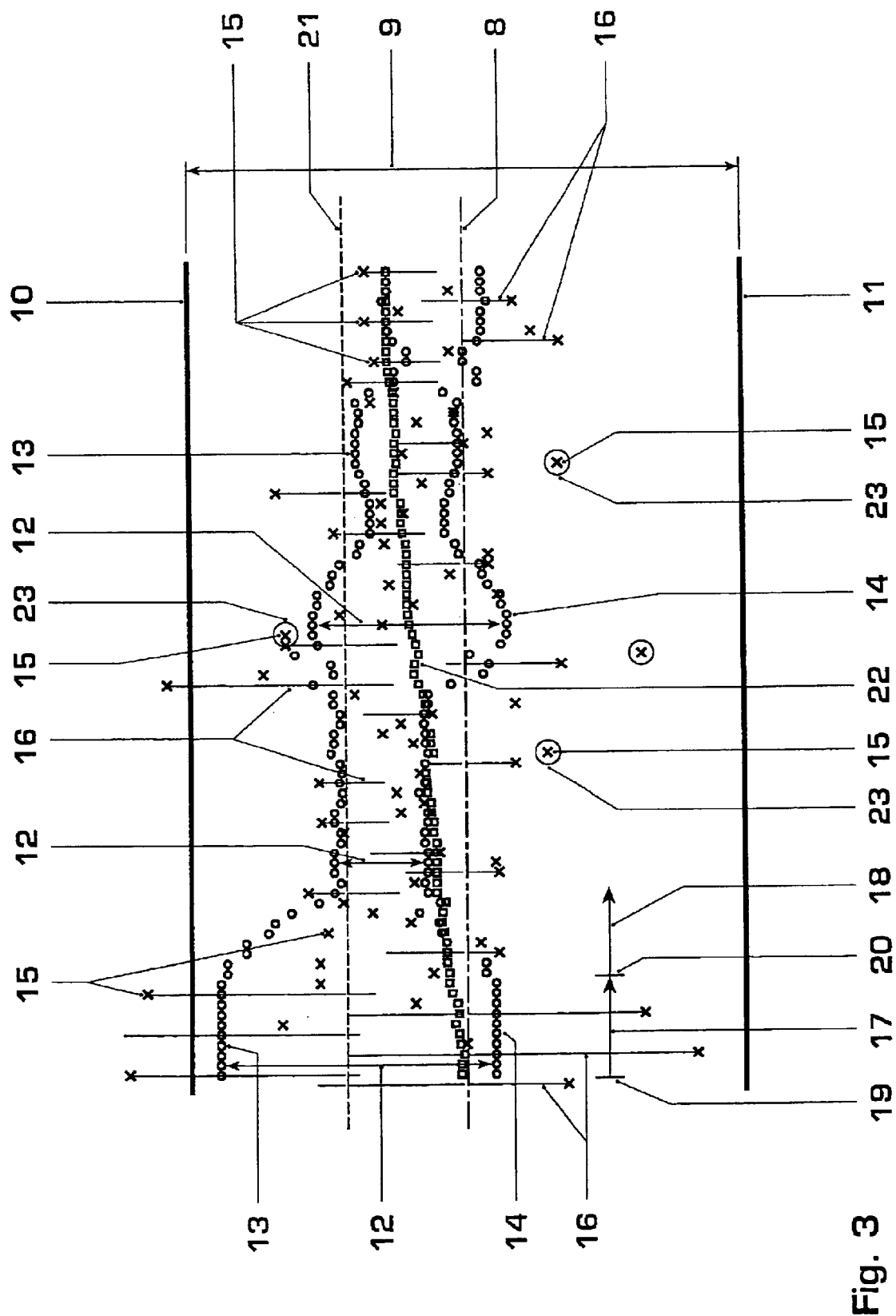
FIG. 3 shows a view as in FIG. 2 but in another embodiment of the production system.

The modes of operation of the production system 1 according to the invention or of the correcting device 4 or of the correction process carried out by the correcting device 4 are explained in more detail below with reference to FIGS. 2 and 3:

In FIGS. 2 and 3, a dot-dash line 8 represents the target dimension which the respective product is to have after it has been processed in the processing device 2. A tolerance interval 9 is arranged such as to enclose this target dimension 8 and is defined by an upper tolerance limit 10 and by a lower tolerance limit 11. The target dimension 8 is expediently arranged centrally between the two tolerance limits 10 and 11. Extending within the tolerance interval 9 is an intervention interval 12, which in turn is defined by an upper intervention limit 13 and a lower intervention limit 14. Since the intervention limits 13, 14 may be dynamic or variable, which will be explained in more detail further below, they are symbolized in FIGS. 2 and 3 by circles following one another.

For the diagrams in FIGS. 2 and 3, in each case a certain actual dimension has been determined for a multiplicity of products of a production batch which are made one after the other. Here, these actual dimensions are in each case represented by crosses, which are partly designated by 15.

In this case, the distances between the determined actual dimensions 15 and the target dimension 8 correspond to the deviations of the respective actual dimensions 15 from the target dimension 8. As long as the actual dimensions 15 lie within the intervention limits 13, 14, the correcting device 4 produces no correction signal. However, as soon as an actual dimension 15 lies outside the intervention interval 12, the correcting device 4 generates a suitable correction signal. These correction signals are symbolized in FIGS. 2 and 3 by lines 16 which extend from the respective actual dimension 15 in the direction of the target dimension 8.

The correcting device 4 is expediently designed in such a way that it permits, firstly, a preliminary operating mode 17 symbolized by an arrow and, secondly, a main operating mode 18 symbolized by an arrow. If a new batch of the products is to be made, a new production cycle begins at 19. At the start of this production cycle, the correcting device 4 works in the preliminary operating mode 17. After a predetermined number of products, the correcting device 4 then changes its operating method at 20 into the main operating mode 18, which is then maintained up to the end of the production cycle. The preliminary operating mode 17 and main operating mode 18 may differ from one another as follows:

During the preliminary operating mode 17, the intervention limits 13, 14 and therefore the intervention interval 12 are constant. In addition, or alternatively, the correction of the control commands during the preliminary operating mode 17 is effected irrespective of whether the respective actual dimension 15 is still within the tolerance interval 9 or is already outside the intervention interval 12 to such an extent that it is also located outside the tolerance interval 9.

Of particular importance is an embodiment in which the correcting device 4, within the preliminary operating mode 17, determines every individual corrective intervention 16 solely from the current actual dimension 15 without at the same time taking into account the history of preceding actual dimensions 15 or preceding corrective interventions 16.

In contrast thereto, the intervention limits 13, 14 in the main operating mode 18 may be variable and may be dynamically adapted to the current state of the production process. In particular, it is possible in this case to automatically vary the intervention limits 13, 14 and therefore the intervention interval 12 as a function of the history of the manufacturing process, that is to say as a function of preceding actual dimensions 15 or of preceding corrective interventions 16. As can be seen in particular from FIG. 2, the correcting device 4 can reduce the intervention interval 12 if a plurality of actual dimensions 15 require no corrective intervention one after the other and/or are in each case relatively far away from the intervention limits 13, 14. Likewise, the intervention interval 12 can be reduced if successive corrective interventions decrease with regard to their magnitude.

Conversely, the correcting device 4 increases the intervention interval 12 if corrective interventions are required more frequently and/or if successive corrective interventions increase with regard to their magnitude. Furthermore, the correcting device 4, e.g. by means of static evaluations, can take into account the previous development of the production process. In particular, trends and outlier behavior can be recognized as a result. The consideration of the history is also of increased interest for the calculation of corrective quantities in order to be able to adapt the corrective behavior of the correcting device 4 to the behavior of the processing device 2. In this case, the current corrective interventions are determined from the current actual dimension 15 and as a function of the preceding actual dimensions 15 or of the preceding corrective interventions 16.

In addition, or alternatively, for the main operating mode 18, provision may be made for the actual dimensions which lie outside the tolerance interval 9 to be treated differently from those which still lie within the tolerance limits 10, 11. For example, in the case of an actual dimension 15 lying outside the tolerance interval 9, the distance from the target dimension may appear in the calculation of the corrective intervention with a greater weighting than in the case of an actual dimension which is still within the tolerance interval 9.

In addition, a further difference between the preliminary operating mode 17 and the main operating mode 18 may lie in the fact that the distance between target dimension and actual dimension is taken into account to a different degree when determining the corrective intervention. For example, in the embodiment according to FIG. 2, the corrective intervention 16 is selected in such a way that the dimension concerned on the following product ought to have the target value. In contrast thereto, in the main operating mode 18, the corrective interventions 16 are typically selected in such a way that the dimension concerned on the following product ought to be specifically above or below the target dimension.

In the embodiment according to FIG. 2, the intervention interval 12 is always oriented centrally relative to the target dimension 8. In particular embodiments, however, it may be desired to deliberately control the position of the actual values of one or more dimensions of the product within the tolerance interval 9. For example, it may be advantageous for a certain application if the actual dimensions 15 preferably stay above the target dimension, that is to say between the target dimension 8 and the upper tolerance limit 10. Such a configuration can be realized in an especially simple manner in the correcting device 4 according to the invention by the intervention interval 12 being positioned within the tolerance interval 9 eccentrically relative to the target dimension 8. According to FIG. 3, the intervention interval 12 is therefore arranged essentially above the target dimension 8. Since the corrective interventions 16 depend essentially on the position of the actual dimensions 15 relative to the intervention interval 12, the result of this is that the actual dimension 15 concerned for the majority of the products lies above the target dimension 8. The aim in this case is to correct toward the center, displaced upward, within the intervention limits 13, 14.

In other particular embodiments, it may be desirable, with regard to a certain geometric dimension, to take into account not only the individual tolerance of an individual product but also the overall tolerance of a production batch. This stipulation applies, for example, to those products which subsequently have to be fitted in a multiple configuration and have to meet certain tolerances in their entirety in this fitted state. The overall tolerance of this production batch is also referred to as cumulative tolerance. In this case, it is perfectly possible for the cumulative tolerance which is ultimately to be adhered to by the entire production batch to deviate from the average value of the individual tolerance of an individual product. To realize such a production batch, the correcting device 4 according to the invention, in a suitable manner, can arrange the intervention interval 12 eccentrically to the target dimension within the tolerance interval 9. Such an example is reproduced in FIG. 3. There, the value of a desired cumulative tolerance 21 is plotted with a dot-dash line. In this case, this cumulative tolerance 21 runs above the target dimension 8. At least in the preliminary operating mode 17, the intervention interval 12 is expediently oriented centrally to the cumulative tolerance 21. Reproduced in FIG. 3 with a solid line is the development of the instantaneous overall tolerance 22, which results from the addition of the values of the products made hitherto. As can be seen from FIG. 3, this instantaneous cumulative tolerance 22 gradually approaches the desired cumulative tolerance 21.

As can likewise be seen from FIG. 3, the correcting device 4 varies the position of the intervention interval 12 relative to the desired cumulative tolerance 21 as production progresses. This change in position of the intervention interval 12 is accompanied here by a change in the eccentricity of the intervention interval 12 relative to the target dimension 8. The correcting device 4 can now vary the eccentricity of the intervention interval 12 as a function of the history of preceding actual dimensions or of preceding corrective interventions. An important factor for determining the eccentricity can be seen, for example, in the remaining distance between the desired cumulative tolerance 21 and the instantaneous cumulative tolerance 22 already achieved. The more the instantaneous cumulative tolerance 22 approaches the desired cumulative tolerance 21, the smaller is the value that can be selected for the eccentricity of the intervention interval 12.

As soon as the instantaneous cumulative tolerance 22 reaches the desired cumulative tolerance 21, the correcting device 4 orients the intervention interval 12 centrally to the target dimension 8.

According to a particular embodiment, the correcting device 4, when determining the required corrective intervention, can also take into account a tool change which has possibly taken place in the processing device 2 in the meantime.

Provided the production system 1 works with a plurality of processing devices 2, it is especially important for the correcting device 4 that a clearly defined correlation is produced between the currently measured product and that processing device 2 which has made this product. Furthermore, it has to be taken into account that a buffer may be present between the measuring device 3 and the processing device 2. For example, the measuring procedure in the measuring device 3 requires so much time that, after the evaluation of the measurement, a corrective intervention in the processing operation taking place instantaneously in the processing device 2 is not possible. Accordingly, the correcting device 4 must recognize that a product which has an inadmissible actual dimension and has led to a corrective intervention can be followed by a further product which has an inadmissible actual dimension but which is not to be used for a correction, since the correction determined on the preceding product comes into effect only on subsequent products. Accordingly, the actual dimensions 15 identified by a circle 23 are without corrective intervention 16 in FIG. 3.

Furthermore, it is possible for the correcting device 4 to be configured in such a way that a predetermined or predeterminable correction limiting factor can be taken into account when determining a corrective intervention. In this case, this correction limiting factor presets a maximum possible correction quantity which can be taken into account in a correction step in the event of a correspondingly large deviation between actual dimension and target dimension. In this way, a vibration behavior can be suppressed if need be.

This correction limiting factor is expediently taken into account by the correcting device 4 only when the actual dimension tested in each case is still within the tolerance interval 9. As soon as the respective actual dimension is outside the tolerance interval 9, larger corrections can also be accepted.

As already mentioned further above, only a single dimension, which is determined by the measuring device 3 and taken into account by the correcting device 4, is reproduced by way of example in FIGS. 2 and 3. By the automation of the correcting operation, it is relatively simple, in particular in a computer-aided manner, to check a plurality of different dimensions, which in addition interact with one another, so that the correction of one dimension can result in effects on one or more other dimensions. The correcting device 4 can take into account these complex interrelationships and can adapt the correction commands accordingly in order to avoid effects on dimensions other than the dimension tested in each case. Even in the event of a plurality of different dimensions having to be corrected, the correcting device 4 can select the requisite corrective interventions in such a way that the desired corrections are obtained without impairing other, uncritical dimensions.

Obviously, numerous modifications and variations of the present invention are possible in light of the above teachings. It is therefore to be understood that, within the scope of the appended claims, the invention may be practiced otherwise than as specifically described herein.

What is claimed is:

1. A production system for the serial manufacture of products, comprising:
    at least one processing device for the automatic processing of products, the processing device actuating at least one tool for processing one of the products, as a function of control commands;
    at least one measuring device for the automatic measuring of at least one geometric actual dimension at one of the products processed by the processing device;
    a correcting device coupled to the processing device and to the measuring device and which compares the at least one measured actual dimension with a preset target dimension which lies within a tolerance interval having an upper tolerance limit and a lower tolerance limit, the correcting device configured and arranged to intervene in a corrective manner in the control commands of the tool if the actual dimension lies outside an intervention interval which lies with an upper intervention limit and with a lower intervention limit within the tolerance interval.

2. The production system as claimed in claim 1, wherein the processing device is configured and arranged for the automatic machining of products and to actuate at least one cutting tool for machining one of the products as a function of control commands.

3. The production system as claimed in claim 1, wherein the correcting device is configured and arranged to permit a preliminary operating mode in which the correcting device orients the intervention interval centrally to the target dimension or centrally to a predetermined cumulative tolerance to be adhered to by the current production batch with regard to the actual dimension.

4. The production system as claimed in claim 1, wherein the correcting device is configured and arranged to permit a preliminary operating mode in which the correcting device keeps the intervention limits constant.

5. The production system as claimed in claim 1, wherein the correcting device is configured and arranged to permit a preliminary operating mode in which the correcting device corrects the control commands if the actual dimensions lies outside the intervention interval, irrespective of whether the actual dimension is within or outside the tolerance interval.

6. The production system as claimed in claim 1, wherein the correcting device is configured and arranged to permit a preliminary operating mode in which the correcting device determines every corrective intervention with reference to the current actual dimension irrespective of preceding actual dimensions, corrective interventions, or both.

7. The production system as claimed in claim 1, wherein the correcting device is configured and arranged to permit a main operating mode in which the correcting device determines the current corrective interventions with reference to the current actual dimension and as a function of preceding actual dimensions, corrective interventions, or both.

8. The production system as claimed in claim 1, wherein the correcting device is configured and arranged to permit a main operating mode in which the correcting device, in the event of the actual dimension lying within the tolerance interval, produces different corrective interventions than in the event of the actual dimension lying outside the tolerance interval.

9. The production system as claimed in claim 1, wherein the correcting device is configured and arranged to permit a main operating mode in which the correcting device automatically varies the intervention limits as a function of preceding actual dimensions, corrective interventions, or both.

10. The production system as claimed in claim 9, wherein the correcting device is configured and arranged to:
    reduce the intervention limits if the number of corrective interventions, the magnitude of the corrective interventions, or both decreases at successive actual dimensions;
    increase the intervention limits if the number of corrective interventions, the magnitude of the corrective interventions, or both increases at successive actual dimensions;
    or both.

11. The production system as claimed in claim 1, wherein the correcting device is configured and arranged to permit a main operating mode in which the correcting device orients the intervention interval eccentrically to the target dimension.

12. The production system as claimed in claim 11, wherein the correcting device is configured and arranged, in the main operating mode, to orient the intervention interval eccentrically to the target dimension until a predetermined cumulative tolerance to be adhered to by the current production batch with regard to the actual dimension is achieved, and to orient the intervention interval centrally to the target dimension as soon as the cumulative tolerance is achieved.

13. The production system as claimed in claim 11, wherein the correcting device is configured and arranged to set the eccentricity with which the intervention interval deviates from the target dimension as a function of the cumulative tolerance while taking into account the preceding actual dimensions, corrective interventions, or both.

14. The production system as claimed in claim 13, wherein the correcting device is configured and arranged to take into account a tool change when determining the corrective intervention.

15. The production system as claimed in claim 14, wherein the correcting device is configured and arranged to take into account a predetermined correction limiting factor which presets a maximum corrective quantity when determining the corrective intervention.

16. The production system as claimed in claim 15, wherein the correcting device is configured and arranged to take into account the correction limiting factor only when the current actual dimension lies within the tolerance interval.

17. The production system as claimed in claims 3, wherein the correcting device is configured and arranged to permit a main operating mode in which the correcting device determines the current corrective interventions with reference to the current actual dimensions and as a function of preceding actual dimensions, corrective interventions, or both; and wherein the correcting device, during a new production cycle, works in the preliminary operating mode for a predetermined number of products and then changes over into the main operating mode.

18. The production system as claimed in claim 1, wherein the correcting device is configured and arranged to simultaneously correct a plurality of dimensions of the product which can influence one another.

19. The production system as claimed in claim 1, wherein the correcting device is configured and arranged to determine the magnitude of the corrective intervention as a function of the distance between the actual dimension and the center of the intervention interval.

* * * * *